June 12, 1951  R. B. ELLIS  2,556,616
METHOD OF MAKING ELECTRICALLY CONDUCTING
GLASS AND ARTICLES MADE THEREFROM
Filed March 25, 1948
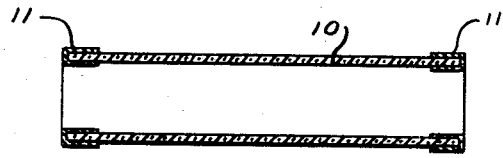
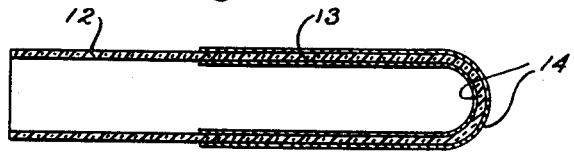
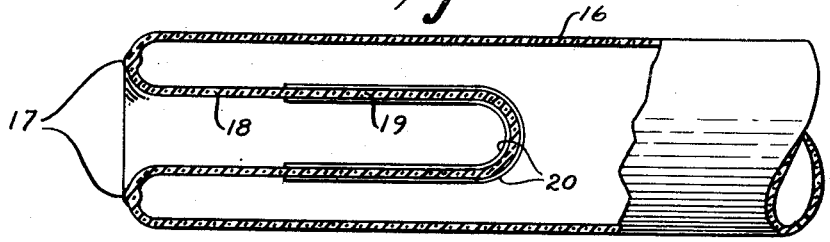
INVENTOR.
RICHARD B. ELLIS
BY
Rolf E. Schneider
ATTORNEY Patented June 12, 1951

2,556,616

UNITED STATES PATENT OFFICE 2,556,616

METHOD OF MAKING ELECTRICALLY CONDUCTING GLASS AND ARTICLES MADE THEREFROM

Richard B. Ellis, Miami, Fla., assignor to Corning Glass Works, Corning, N. Y., a corporation of New York Application March 25, 1948, Serial No. 16,954

6 Claims. (Cl. 250—27.5)

This invention relates to highly siliceous glasses of the type described in Patent 2,106,744 and more particularly to a method of lowering the electrical resistivities of such glasses. The glasses of the patent, on the anhydrous basis, comprise over 93% $SiO_2$, not over 6% $B_2O_3$ and not over 1% alkali metal oxides and are made by leaching soluble constituents from ordinary borosilicate glasses to leave a porous siliceous glass having inter-communicating sub-microscopic pores and such porous glass may be fired to close the pores and produce a non-porous glass having an unusually low expansion coefficient and other valuable properties.

It has also been shown in Patents 2,315,329 and 2,355,746 to be desirable for some purposes to impregnate the leached porous glass with organic or inorganic materials such as dyes, pigments, resins, metal salts and the like. In case the impregnant is an inorganic material the glass may subsequently be fired to close the pores. Firing is not desirable when the impregnant is organic because the material is thereby decomposed or oxidized to volatile compounds which are eliminated from the glass. Prior glasses so produced are electrically non-conducting when fired to a vitreous non-porous condition.

Prior electrically conducting compositions made by sintering powdered glass mixed with graphite or carbonaceous materials, although useful for some purposes, are porous. When fired sufficiently to become vitreous and non-porous, they become also non-conducting because the individual particles of carbon, if not oxidized and eliminated, become surrounded by the glass and thereby insulated from one another.

However, a vitreous non-porous electrically conducting glass is desirable for many purposes and the production of such a glass is the primary object of this invention.

Another object is to provide a method for dispersing throughout a vitreous glass sufficient carbon to make the glass electrically conducting.

Another object is to impregnate and fire a leached, porous glass so as to produce a vitreous non-porous glass having an electrical resistivity as low as one ohm-cm. or less.

Another object is to provide a resistor made of glass.

Another object is to provide a glass electrode and lead-in for a gaseous discharge device.

To these and other ends the invention includes a method of making an electrically conducting glass and articles made therefrom, to be hereafter more fully described and claimed in the appended claims and illustrated in the accompanying drawing in which:

Fig. 1 is a sectional view of a tubular glass resistor in accordance with my invention.

Fig. 2 is a sectional view of a tubular glass electrode made in accordance with my invention and Fig. 3 is a side view partly in section of one end of a gaseous discharge tube provided with a glass electrode in accordance with my invention.

I have now found that a vitreous non-porous electrically conducting glass can be made by impregnating the porous glass described in Patent No. 2,106,744 with a solution containing a soluble carbohydrate or derivative until the carbon content of the glass amounts to at least 4% by weight of the glass and thereafter drying and firing the impregnated article non-oxidizingly to carbonize the organic material within the pores and to close the pores. The fired impregnated glass comprises over 87% $SiO_2$, less than 6% $B_2O_3$, less than 1% alkali metal oxides and at least 4% of dispersed carbon by weight.

Any soluble carbohydrate or derivative can be employed for my purpose including particularly the various saccharides and polysaccharides. Carbohydrates generally are suitable because they carbonize without excessive formation of volatile carbon compounds when heated. Sucrose is particularly suitable because of its high carbon content and extreme solubility in water whereby solutions containing up to about 90% or more by weight of sucrose can be prepared. Cellulose derivatives such as ethyl cellulose, cellulose acetate, etc., have a still higher carbon content and are soluble in toluene or other organic solvents. Starch and cellulose per se on the contrary are relatively insoluble and hence are not as suitable for my purpose. Organic compounds which were previously used in impregnating the porous glass for other purposes are not suitable for the present purposes because when they are decomposed by heat they yield volatile compounds resulting in loss of carbon from the glass.

In order that the finished glass may be electrically conducting, i. e., have an electrical resistivity of less than one megohm-cm., I have found that it must contain at least 4% by weight of carbon. The introduction of a sufficient quantity of the carbohydrate or derivative into the porous glass to provide the necessary content of carbon in the final glass is preferably accomplished by immersing the porous glass in a solution having a carbon content equivalent to at least 20% of carbon by weight and preferably heated to increase the solubility of the material and reduce the viscosity of the solution. For this purpose the use of highly soluble materials is necessary, as for instance, an aqueous solution containing at least 55% by weight of sucrose which is equivalent to somewhat over 20% by weight of carbon. A single impregnation with an aqueous solution containing about 55% by weight of sucrose produces a glass containing about 4% of carbon providing that none is lost by rinsing the impregnated glass or by oxidation during firing. The electrical resistivity of such a glass amounts to several thousand ohm-cm. Impregnation with an aqueous solution containing about 90% by weight of sucrose produces a glass containing over 6% of carbon and its electrical resistivity is less than one ohm-cm.

On account of a tendency for the porous glass when impregnated with an aqueous solution to crack during drying, it is advantageous to rinse the impregnated porous glass article with acetone. Such a rinsing displaces the water in the pores with acetone which evaporates readily without the establishment of breaking stresses in the glass. Porous glass impregnated with non-aqueous solutions such as ethyl cellulose dissolved in toluene and alcohol have little or no tendency to crack during drying.

Although it is preferably to impregnate the porous glass with a single treatment with a solution having a carbon content of at least 20% by weight, it will be apparent that impregnation may also be accomplished by a plurality of treatments with more dilute solutions whereby the glass is alternately treated to saturate its pores and dried to eliminate the solvent until the equivalent carbon content of the glass is at least 4% by weight. Such an alternative method, although not to be preferred, falls within the broader scope of the invention as defined in the claims.

The following examples illustrate the new method of introducing sufficient dispersed carbon into glass to render it electrically conducting but it is to be understood that such examples are not intended to limit the invention except insofar as it is defined in the claims.

Example 1

A rod of the previously described porous glass 3 mm. in diameter was impregnated by immersion for 48 hours in a solution containing 66% by weight of sucrose in water at about 95° C.

Thereafter it was dried slowly and fired up to 1200° C. in an atmosphere of hydrogen containing sufficient nitrogen to render it non-explosive. The sugar was thereby carbonized and dehydrated and the rod after firing was vitreous, non-porous and black. The tip ends of the rod were cut off to afford better electrical contact and the electrical resistivity was measured in the usual manner and was found to be about 5.5 ohm cm.

Example 2

A tube of the porous glass having an external diameter of 16 mm. was impregnated in the manner described in Example 1, using a solution containing 80% by weight of sucrose in water. After removal of the impregnated glass tube from the hot, syrupy solution, it was immediately rinsed in acetone and thereafter was dried and heated slowly from room temperature to about 1250° C., in an atmosphere of nitrogen.

The ends of the fired tube were etched briefly in hydrofluoric acid to provide optimum electrical contact and the etched portion was electroplated with copper. The resistivity of the impregnated glass was about .9 ohm cm. To determine if the contact resistance between the electroplated copper and the carbon in the glass was variable the copper plate was dissolved off with nitric acid and the glass was again lightly etched with hydrofluoric acid and again electroplated with copper. The overall resistance of the glass tube remained unchanged.

Example 3

Several small tubes of the porous glass having diameters of about 7 mm. were impregnated for about 24 hours by immersion in a solution containing 50 gm. of ethyl cellulose dissolved in a mixture of 75 cc. of toluene and 25 cc. of ethanol heated at about 80 to 90° C. under a reflux condenser. The tubes were then wiped off and dried and heated slowly to about 1250° C. in an atmosphere of nitrogen. The ends of the tubes were cut off and their resistances were measured. The average electrical resistivity calculated to about 5.5 ohm cm.

Articles made in accordance with the above described method are useful for various purposes including resistors such as grid leaks and other fixed resistances for use in radio circuits, telephone systems and the like, combination lead-in and electrode for gaseous discharge devices such as vapor arc lamps, etc.

In Fig. 1 a tube 10 suitable for use as a resistor is composed of non-porous glass having a composition comprising over 87% $SiO_2$, less than 6% $B_2O_3$, less than 1% alkali metal oxides and at least 4% carbon and having an electrical resistivity less than one megohm-cm. and is provided with electroplated metallized contacts 11.

In Fig. 2 a partially impregnated glass tube suitable for a lead-in has an open end portion 12, composed of non-porous glass and a closed end portion 13 composed of a non-porous glass containing at least 4% and preferably about 6% by weight of dispersed carbon. The portion 13 has an inner and an outer overlying coating of metal 14.

Such a tube was made from a porous glass tube by first firing one end to close the pores therein and then impregnating the unfired end with a carbohydrate such as sucrose and firing the impregnated portion to carbonize the sucrose and close the pores. Alternatively the entire porous tube may be impregnated and the carbon eliminated from one portion by firing that portion in an oxidizing atmosphere at a temperature insufficient to close the pores after which the entire article is fired in a non-oxidizing atmosphere at a temperature sufficient to close the pores throughout the glass. The carbon containing portion of the tube is then metallized by methods well-known for this purpose. For example, the portion to be metallized is coated with a metallizing composition such as "silver paste," "platinum bright," "copper resinate" and the like, and the article is fired at a temperature to cause the metal to adhere to the glass.

In Fig. 3 an electrical discharge device having an envelope or tube 16 composed of fused silica or glass containing over 93% $SiO_2$ is provided with a re-entrant tubular glass electrode similar to that shown in Fig. 2 which is joined to the tube 16 by a seal 17. The electrode has a clear portion 18 and a carbon containing portion 19 which is metallized with an inner and an outer layer of metal 20. The electrode may be connected to a source of electric current by means of an expanding metal contact (not shown) which is inserted inside the electrode and brought into contact with the metallized coating 20. If desired, a thin metal tube (not shown) of a size to fit snugly over the outer metal layer 20 may be placed over the glass electrode as a shield to protect it and to improve its action.

I claim:

1. A glass article a portion of which is electrically non-conducting and comprises $SiO_2$ in an amount over 93%, $B_2O_3$ in an amount less than 6%, and alkali metal oxides in an amount less than 1% and the remainder of which is electrically conducting and comprises $SiO_2$ in an amount over 87%, $B_2O_3$ in an amount less than 6%, alkali metal oxides in an amount less than 1% and at least 4% carbon, the carbon being within the body of the glass.

2. The method of making an electrically conducting glass having an electrical resistivity of less than one megohm cm., which comprises impregnating a submicroscopically porous glass comprising $SiO_2$ in an amount over 93%, $B_2O_3$ in an amount less than 6%, and alkali metal oxides in an amount less than 1% with a solution in a solvent therefor of a saccharide, the solution having a carbon content derived from the saccharide of at least 20% by weight, drying the impregnated glass to eliminate the solvent and thereafter firing the impregnated glass up to at least 1200° C. in a non-oxidizing atmosphere to completely carbonize the saccharide within the pores and to effect consolidation to a non-porous glass containing the resulting carbon within its mass.

3. The method of claim 2 in which the impregnating solution comprises an aqueous solution of sucrose.

4. The method of claim 2 in which the impregnating solution comprises a solution of ethyl cellulose.

5. An envelope of a glass composed of over 93% $SiO_2$, and a non-porous glass member joined by fusion to the envelope and forming a closure therefor, the portion of the glass member in and adjacent to the joint being composed of a glass comprising $SiO_2$ in an amount over 93%, $B_2O_3$ in an amount less than 6%, and alkali metal oxides in an amount less than 1%, and the remainder of the glass member being composed of an electrically conducting glass comprising $SiO_2$ in an amount over 87%, $B_2O_3$ in an amount less than 6%, alkali metal oxides in an amount less than 1% and at least 4% carbon, the carbon being within the body of the glass.

6. An electrically conducting glass having an electrical resistivity of less than one megohm cm. and comprising $SiO_2$ in an amount over 87%, $B_2O_3$ in an amount less than 6%, alkali metal oxides in an amount less than 1%, and at least 4% of carbon, the carbon being within the body of the glass.

RICHARD B. ELLIS.

REFERENCES CITED

The following references are of record in the file of this patent:

UNITED STATES PATENTS

| Number | Name | Date |
|---|---|---|
| 1,834,761 | Berthold | Dec. 1, 1931 |
| 1,924,752 | Rising | Aug. 29, 1933 |
| 2,038,691 | Taylor | Apr. 28, 1936 |
| 2,064,369 | Biggs | Dec. 15, 1936 |
| 2,303,756 | Nordberg et al. | Dec. 1, 1942 |
| 2,315,329 | Hood et al. | Mar. 30, 1943 |
| 2,341,219 | Jones | Feb. 8, 1944 |